United States Patent
Kuykendal et al.

(10) Patent No.: US 6,543,925 B2
(45) Date of Patent: Apr. 8, 2003

(54) MULTI-COLORED FOUNTAIN LIGHT

(76) Inventors: Robert L. Kuykendal, 4118 Harbor Town, High Ridge, MO (US) 63049; Ronald S. Deichmann, 4997 Dover La., House Springs, MO (US) 63051

(*) Notice: Subject to any disclaimer, the term of this patent is extended or adjusted under 35 U.S.C. 154(b) by 0 days.

(21) Appl. No.: 09/813,142

(22) Filed: Mar. 21, 2001

(65) Prior Publication Data

US 2002/0136024 A1 Sep. 26, 2002

(51) Int. Cl.⁷ ............................................. F21V 7/04
(52) U.S. Cl. .................. 362/554; 362/555; 362/554; 362/565; 362/96; 239/18
(58) Field of Search .................. 362/554, 551, 362/565, 562, 96; 239/18, 19, 20

(56) References Cited

U.S. PATENT DOCUMENTS

| | | | | |
|---|---|---|---|---|
| 3,803,398 A | * | 4/1974 | Walker | 362/551 |
| 4,705,216 A | * | 11/1987 | Kaffka et al. | 239/18 |
| 4,901,922 A | * | 2/1990 | Kessener et al. | 239/12 |
| 5,301,090 A | * | 4/1994 | Hed | 362/551 |
| 6,076,741 A | * | 6/2000 | Dandrel | 239/18 |
| 6,149,070 A | * | 11/2000 | Hones | 239/17 |
| 6,393,192 B1 | * | 5/2002 | Koren | 385/147 |

* cited by examiner

Primary Examiner—Alan Cariaso
Assistant Examiner—Ali Alavi
(74) Attorney, Agent, or Firm—Henry W. Cummings

(57) ABSTRACT

This invention discloses a method and apparatus for creating a variable colored lighting effect at some desired remote location by means of multiple source lighting means, usually red, blue and green, illuminating the end of individual bundles of fiber optic cables which are then combined into one larger cable bundle which is then routed to the desired remote location.

4 Claims, 2 Drawing Sheets

MULTI-COLORED FOUNTAIN LIGHT

FIELD OF THE INVENTION

This invention discloses a method and apparatus for creating a variable colored lighting effect at some desired remote location by means of multiple source lighting means, usually red, blue and green, illuminating the end of individual bundles of fiber optic cables which are then combined into one larger cable bundle which is then routed to the desired remote location.

BACKGROUND OF THE INVENTION AND OBJECTS

In the field of ornamental fountains it is frequently desirable to focus a light at a point or within a nozzle or other point of fluid flow for decorative purposes. It is also frequently desirable to change the color of the light. This is often accomplished by means of a light color wheel which illuminates one end of a bundle of fiber optic cables, the other end of which is routed to some strategic point where the ornamental lighting effect is desired. The arrangement is well known to persons knowledgeable of the field.

SUMMARY OF THE INVENTION

In FIG. 1, individual light source color A, 1, illuminates the end of fiber optic bundle, 2, and the light from color A, 2, travels the length of bundle, 2, where it joins and becomes part of the combined fiber optic bundle, 7, and shines out the far end of combined fiber optic bundle, 7, as the resulting light, 8. Likewise when light source color B, 3, is illuminated, the light travels the length of fiber optic bundle, 4, where it becomes part of the combined fiber optic bundle, 7, and shines out the end of combined fiber optic bundle, 7, as part of the resulting light, 8. Likewise when color C light source, 5, is illuminated, the light travels the length of fiber optic bundle, 6, where it becomes part of the combined fiber optic bundle, 7, and shines out the end of combined fiber optic bundle, 7, as part of the resulting light, 8. Individual fibers comprising bundles, 2, 4 and 6 are substantially intertwined and mixed into the combined fiber optic bundle, 7, so that the resulting light, 8, is comprised of multiple individual points of light and the resulting color tends to be a mix of the originating source colors, color A, 1, color B, 3 and color C, 5.

FIG. 2, illustrates three source color lights and three individual fiber optic bundles, collectively indicated at 12 and combined fiber optic bundle, 11, routed through a water light seal, 14, into the base of an ornamental fountain nozzle. In a manner familiar to any practitioner of the art of ornamental fountains, pressurized water is made to flow into inlet port, 10, of fountain nozzle, 9, creating an output stream, 13. With this invention, however, the output stream, 13, may be illuminated to any color or intensity within the limits of the three color light sources indicated at, 12.

THE DRAWINGS

DESCRIPTION OF PREFERRED EMBODIMENTS

Figure 1:
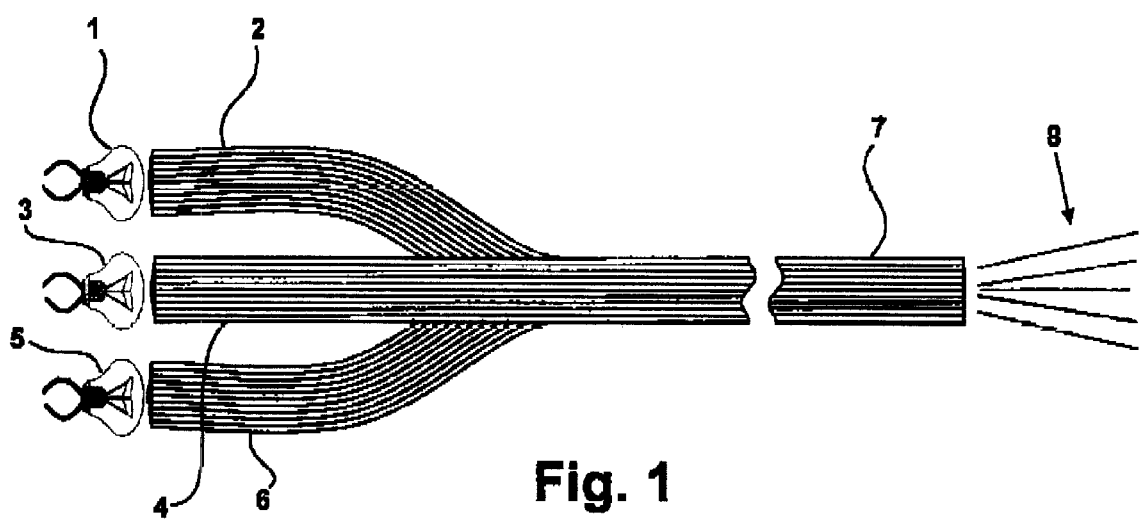
FIG. 1 is a schematic view of one embodiment of the invention.

In FIG. 1, individual light source color A, 1, illuminates the end of fiber optic bundle, 2, and the light from color A, 2, travels the length of bundle, 2, where it joins and becomes part of the combined fiber optic bundle, 7, and shines out the far end of combined fiber optic bundle, 7, as the resulting light, 8. Likewise when light source color B, 3, is illuminated, the light travels the length of fiber optic bundle, 4, where it becomes part of the combined fiber optic bundle, 7, and shines out the end of combined fiber optic bundle, 7, as part of the resulting light, 8. Likewise when color C light source, 5, is illuminated, the light travels the length of fiber optic bundle, 6, where it becomes part of the combined fiber optic bundle, 7, and shines out the end of combined fiber optic bundle, 7, as part of the resulting light, 8. Individual fibers comprising bundles, 2, 4 and 6 are substantially intertwined and mixed into the combined fiber optic bundle, 7, so that the resulting light, 8, is comprised of multiple individual points of light and the resulting color tends to be a mix of the originating source colors, color A, 1, color B, 3 and color C, 5.

Figure 2:
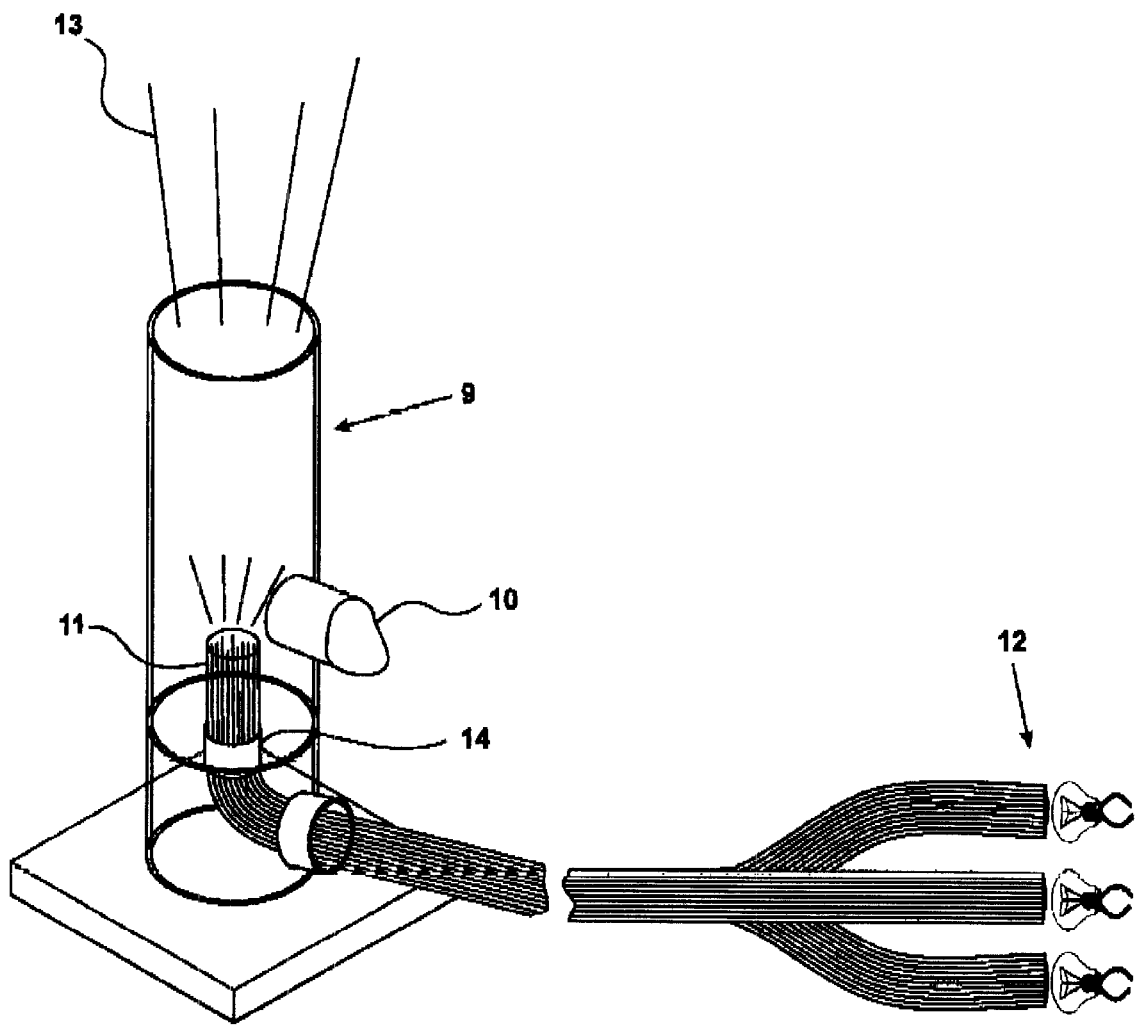
FIG. 2 is a schematic, perspective view of another embodiment of the invention directed to a decorative fountain.

FIG. 2, illustrates three source color lights and three individual fiber optic bundles, collectively indicated at 12 and combined fiber optic bundle, 11, routed through a water light seal, 14, into the base of an ornamental fountain nozzle. In a manner familiar to any practitioner of the art of ornamental fountains, pressurized water is made to flow into inlet port, 10, of fountain nozzle, 9, creating an output stream, 13. With this invention, however, the output stream, 13, may be illuminated to any color or intensity within the limits of the three color light sources indicated at, 12.

In operation, then any individual source light may be turned on or off as desired. For example, if source color A, 1, is blue and source color B, 3, is green, then if only source color A, 1, is turned on the resulting light, 8, will be blue. Likewise if only source color B, 3, is turned on the resulting light, 8, will be green. However, if both source color A, 1, and source color B, 3, are turned on then the resulting light, 8, will be yellow. Any number of source color lights, 2 or more, may be combined in this manner and the individual source color lights may be of any color, type, or intensity such as incandescent, laser or LED, red, green or whatever. Also, this method and apparatus may be used for other applications in addition to fountain light.

What is claimed is:

1. An ornamental fountain comprising:

a fountain base having a substantially water tight seal;

multiple source lighting means for lighting at least two colors selected from red, blue, green, yellow and white;

bundles of fiber optic cables having a first end and a second end;

means for illuminating said first end of said bundles of fiber optic cables;

means for combining said bundles at said second end into at least one larger cable bundle;

means for routing said larger cable into said base and through said seal;

said fountain having an inlet port and a fountain nozzle;

means for supplying pressurized water into said inlet port, and into said fountain nozzle;

means for creating an output stream and means for illuminating said output stream with said cable in said fountain;

said individual fibers from said bundles being substantially intertwined and mixed into the combined fiber optic bundle whereby the resulting light is comprised of multiple individual points of light, and the resulting color comprises a mix of said originating source colors and means for routing said larger cable to a desired remote location.

2. Apparatus according to claim 1 including lighting means for lighting all three colors of red, blue and green.

3. An ornamental fountain according to claim 1 including means for varying said illuminated color.

4. An ornamental fountain according to claim 1 including means for varying illuminated color intensity within the limits of said two-color light sources.

* * * * *